(12) United States Patent
Huang et al.

(10) Patent No.: US 12,442,681 B2
(45) Date of Patent: Oct. 14, 2025

(54) DISTRIBUTED FIBER OPTIC SENSING ENABLED SELF-COHERENT DETECTION FOR DATA CENTERS

(71) Applicant: NEC Laboratories America, Inc., Princeton, NJ (US)

(72) Inventors: Yue-Kai Huang, Princeton, NJ (US); Ezra Ip, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 158 days.

(21) Appl. No.: 17/966,856

(22) Filed: Oct. 16, 2022

(65) Prior Publication Data

US 2023/0119927 A1    Apr. 20, 2023

Related U.S. Application Data

(60) Provisional application No. 63/256,799, filed on Oct. 18, 2021.

(51) Int. Cl.
*H04B 10/63* (2013.01)
*G01H 9/00* (2006.01)
*H04B 10/2537* (2013.01)
*H04B 10/61* (2013.01)

(52) U.S. Cl.
CPC ......... *G01H 9/004* (2013.01); *H04B 10/2537* (2013.01); *H04B 10/65* (2020.05)

(58) Field of Classification Search
CPC .............................. G01H 9/004; H04B 10/63
See application file for complete search history.

(56) References Cited

U.S. PATENT DOCUMENTS

2020/0249076 A1* 8/2020 Ip .......................... G01H 9/004
2021/0080350 A1   3/2021 Lecoeuche
2021/0159983 A1* 5/2021 Morsy-Osman ....... H04B 10/40

* cited by examiner

*Primary Examiner* — Shi K Li
(74) *Attorney, Agent, or Firm* — Joseph Kolodka

(57) ABSTRACT

Aspects of the present disclosure describe distributed fiber optic sensing (DFOS) systems, methods, and structures that advantageously sense/monitor intra-data center operations using self-coherent detection. Advantageously, sensing signal(s) and data signal(s) are optically multiplexed such that the sensing signal(s) are generated and detected using the same optoelectronic components as data generation and detection while requiring only minimal changes to transponder arrangements and no additional bandwidth to digital-to-analog converters (DAC) or analog-to-digital converters (ADC).

9 Claims, 6 Drawing Sheets

DISTRIBUTED FIBER OPTIC SENSING ENABLED SELF-COHERENT DETECTION FOR DATA CENTERS

CROSS REFERENCE

This application claims the benefit of U.S. Provisional Patent Application Ser. No. 63/256,799 filed 18 Oct. 2021, the entire contents of which being incorporated by reference as if set forth at length herein.

TECHNICAL FIELD

This disclosure relates generally to distributed fiber optic sensing (DFOS) systems, methods, and structures and DFOS enabled self-coherent detection for data centers.

BACKGROUND

As is known, optical fiber networks form a backbone of modern high-speed communications networks including the Internet. In addition to providing data transmission however, optical fibers and cables constructed therefrom have also be employed to monitor ambient environments. The ubiquity of optical cables, especially in metropolitan environments, allows distributed fiber optic sensing (DFOS) over wide geographic areas. For telecom operators, distributed sensing provides new revenue sources for a deployed fiber infrastructure. In the context of data centers, optical fiber sensing can also be used to monitor operational aspects such as vibration, infrastructure health, and intrusion detection—among others.

As the data rate of intra-data center links has continued to increase, self-homodyne detection has been recently proposed as a mechanism to increase spectral efficiency, thereby allowing higher throughput for the same optoelectronic component bandwidths in a simplified coherent receiver. Self-homodyne detection schemes that have been proposed utilize two fibers, one for transmitting the data-bearing signal, and the other for transmitting the local oscillator (LO) (see, e.g., L. Wang, Y. Zeng, T. Yang, C. Xin, H. Du, X. Wang and M. Tang, "First real-time MIMO-free 800 Gb/s DP-64QAM demonstration using bi-directional self-homodyne coherent transceiver," *Optical Fiber Conference* (OFC 2021), Paper Th3.C.2, San Francisco, CA, USA (2021); and M. Sowailem, E. El-Fiky, M. Morsy-Osman, Q. Zhuge, T. Hoang, S. Paquet, C. Paquet, I. Woods, O. Liboiron-Ladouceur and D. Plant, "Self-homodyne system or next-generation intra-datacenter optical interconnects," Opt. Exp. Vol. 25, no. 22, pp. 27834-27844).

SUMMARY

An advance in the art is made according to aspects of the present disclosure directed intra-data center self-coherent detection that is architecturally extended to provide DFOS functionality.

In sharp contrast to the prior art, sensing signal(s) and data signal(s) are optically multiplexed such that the sensing signal(s) are generated and detected using the same optoelectronic components as data generation and detection while requiring only minimal changes to transponder arrangements and no additional bandwidth to digital-to-analog converters (DAC) or analog-to-digital converters (ADC).

BRIEF DESCRIPTION OF THE DRAWING

A more complete understanding of the present disclosure may be realized by reference to the accompanying drawing in which.

DESCRIPTION

Figure 1:
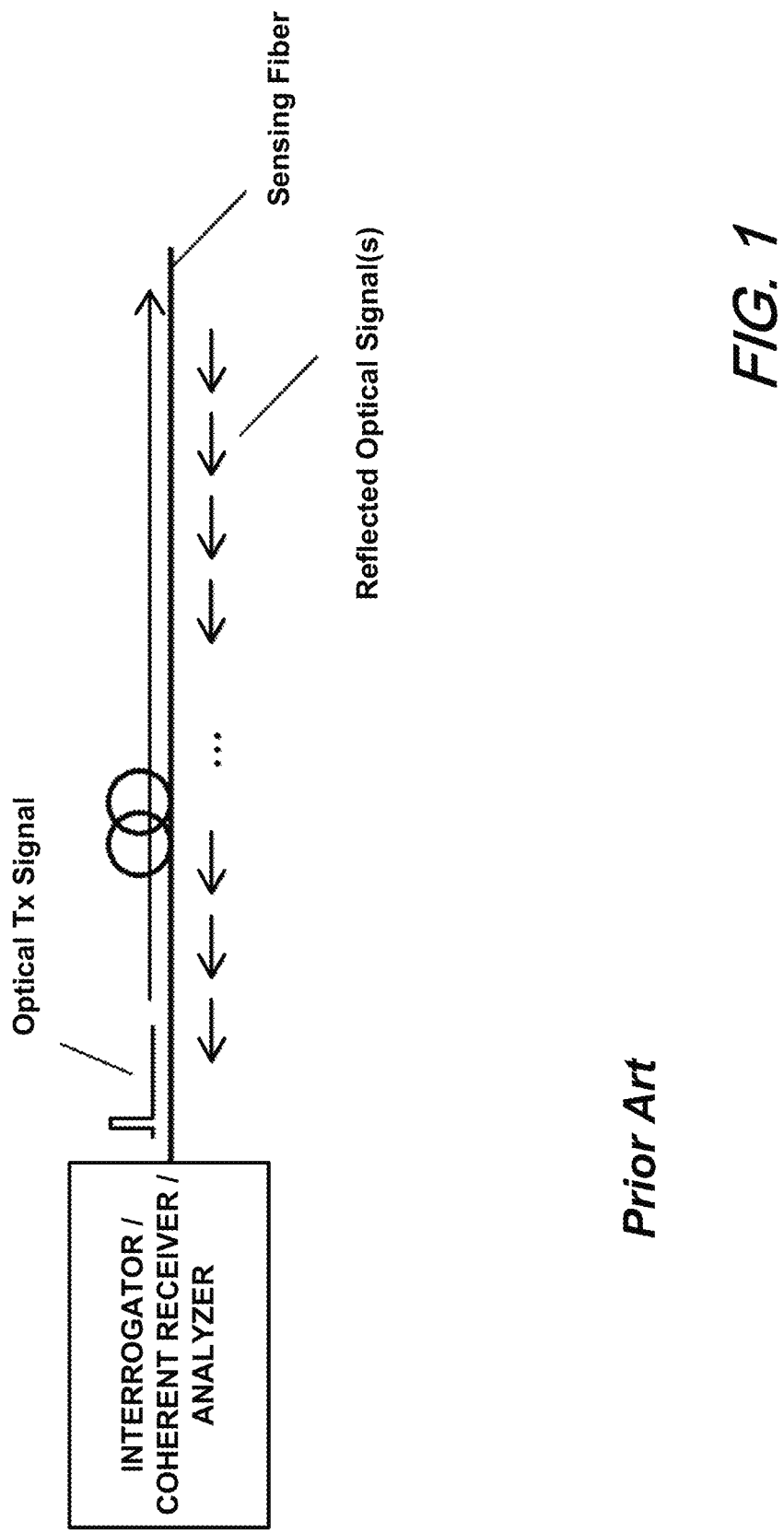
FIG. 1 is a schematic diagram illustrating a DFOS system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. As will be understood and appreciated, the interrogator may include a coded DFOS system that may employ a coherent receiver arrangement known in the art.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

Figure 2:
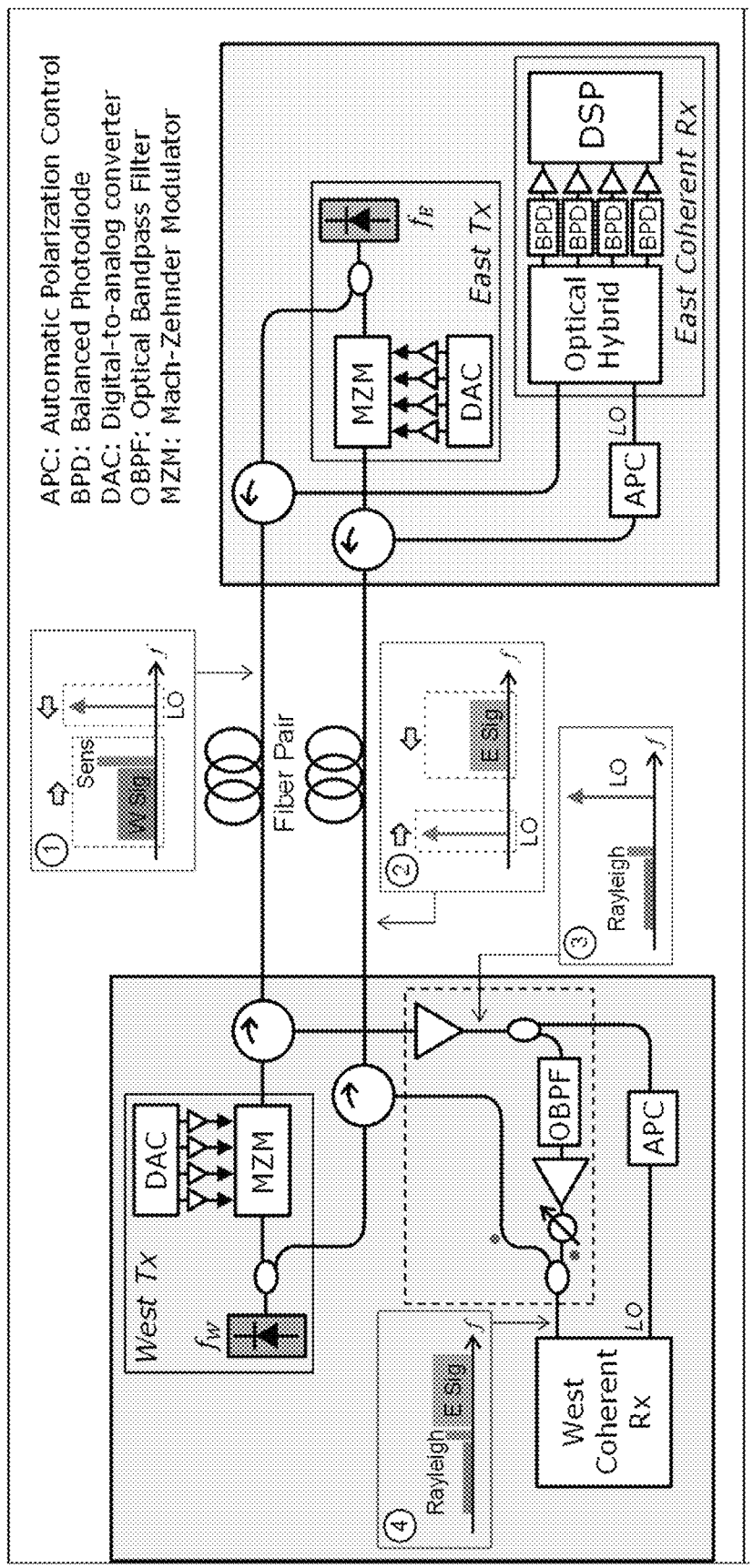
FIG. 2 is a schematic diagram illustrating a DFOS-enabled self-coherent transponder architecture/arrangement according to aspects of the present disclosure.

FIG. 2 is a schematic diagram illustrating a DFOS-enabled self-coherent transponder architecture/arrangement according to aspects of the present disclosure. An architecture change is shown by the dotted box in the figure, comprising only amplifiers, an optical bandpass filter, and passive splitters. As we shall show and describe, these components enable combining of the received data signal with the Rayleigh backscatter of the sensing signal prior to coherent detection. The sensing signal and data signal may then be processed separately using conventional DSP for each function.

With continued reference to FIG. 2, shown therein is a two-way communication link is established between East (E) and West (W) transponders over an optical fiber pair. In the upper (top) optical fiber, a West data signal propagates in the W-E direction, while an East local oscillator (LO) data signal propagates in the E-W direction. Meanwhile, a lower (bottom) optical fiber carries the West LO in the W-E direction and the East data signal in the E-W direction. The spectra of the top and bottom fibers are shown in insets 1 and 2 in the figure.

To recover transmitted bits, each transceiver performs self-coherent detection by using the LO from the opposite transponder to perform demodulation. We assume active polarization controller are used at each transponder to ensure the LO is aligned with the reference polarization of the optical hybrid. Self-coherent detection for data centers using reduced-complexity DSP has been studied while the configuration of having each signal counter-propagate against the LO in each fiber as depicted in FIG. 2 was likewise proposed in the art and may allow polarization demultiplexing without 2×2 MIMO—however this is not required for the present invention according to the instant disclosure.

As noted previously, and according to aspects of the present disclosure, we add distributed acoustic sensing (DAS) functionality to the architecture by spectrally multiplexing a sensing signal (shown in inset 1 in FIG. 2) just outside the bandwidth of the signal. The sensing signal may be a non-chirped pulse, a chirped pulse, a Golay-coded sequence, or any other appropriate signals.

As the bandwidth of the sensing signal (not shown to scale in FIG. 2) is typically on order of tens of MHz, which is much smaller than the baud rate of the data signal, which is typically tens of GHz, we advantageously employ: (i) using the same digital-to-analog converter (DAC) at the transmitter to generate both the data and sensing signals, and (ii) at the West receiver, the same digital coherent receiver is used to simultaneously recover both the East data signal and the Rayleigh backscatter generated by the West sensing signal. This is possible as the frequency responses of the opto-electronic components in the link, which may include DACs, electrical driver amplifiers, optical modulators, balanced photodiodes, trans-impedance amplifiers (TIAs), and analog-to-digital converters (ADC), tend to roll-off gradually.

The dotted box illustrated in FIG. 2 shows the optical components needed to realize joint detection of the East data signal and the Rayleigh backscatter of the West sensing signal. At the drop port of the top-left circulator, the signal is first amplified and then passively split. Since the Rayleigh backscatter is at much lower power than East LO, as shown by the inset 3 in FIG. 2, we inject it into the LO port of the West coherent receiver after passing it through the active polarization controller (APC) for polarization alignment; the backscatter of the West data & sensing signals will at most result in a slightly "noisy" LO.

At the other output of the splitter, a sharp optical bandpass filter (OBPF) suppresses the East LO and passes the Rayleigh backscatter. This requires the transition region of the OBPF to be sharp enough to achieve high LO extinction over a frequency range slightly wider than the one-sided bandwidth of the data signal. The output of the OBPF is then amplified, followed by combining with the East signal using a passive splitter. The combined signal (inset 4 in FIG. 1) is then injected into the signal port of the West coherent receiver.

Figure 3:
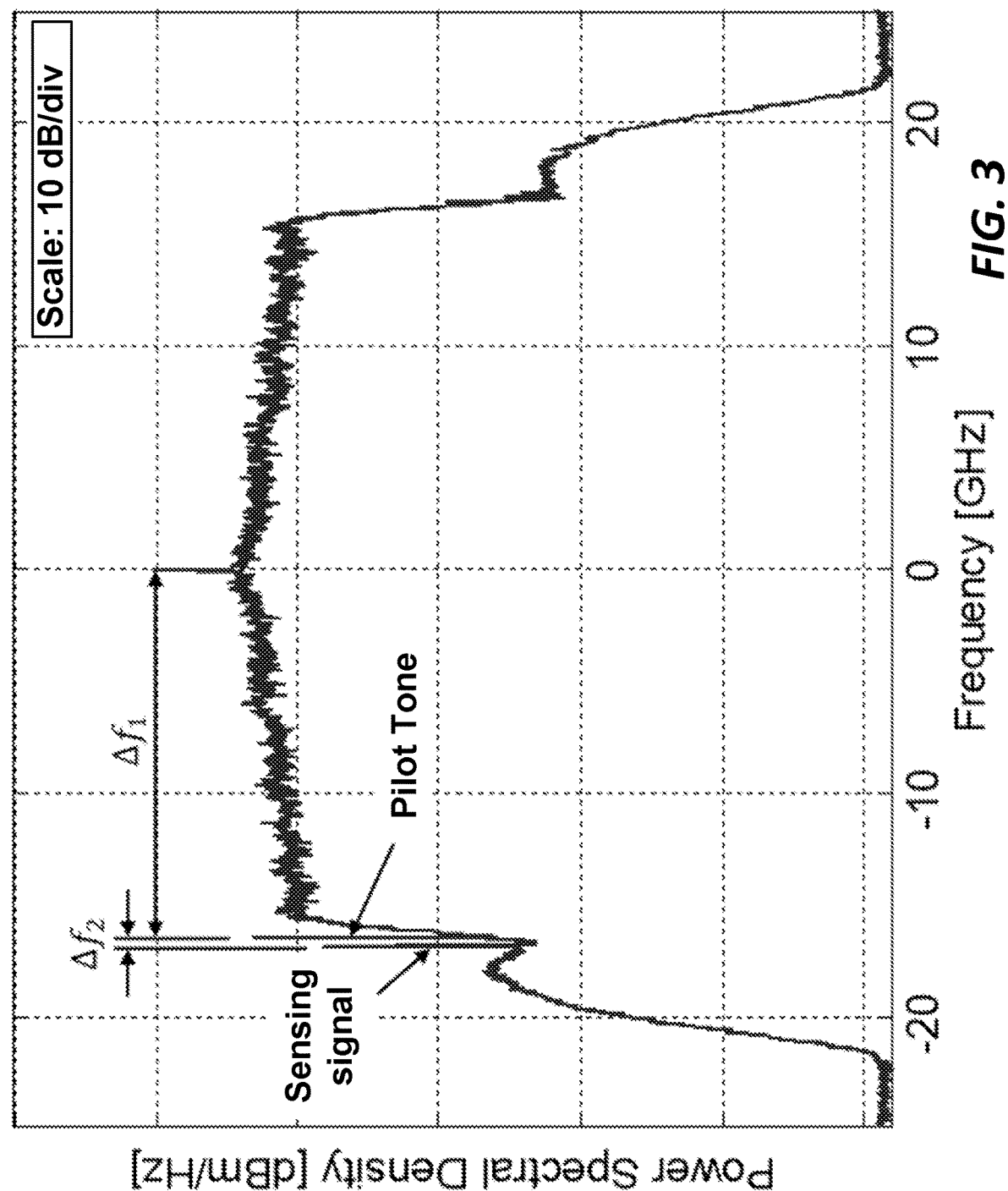
FIG. 3 is a plot illustrating an example electrical spectrum of a combined signal at West receiver after optical-to-electrical demodulation with East LO as illustrated in FIG. 2, according to aspects of the present disclosure.

FIG. 3 is a plot illustrating an example electrical spectrum of a combined signal at West receiver after optical-toelectrical demodulation with East LO as illustrated in FIG. 2, according to aspects of the present disclosure.

Note the Rayleigh backscatter of the West data signal is outside of the bandwidth of the receiver and will not be recovered. The electrical signals generated by the West coherent receiver comprise the East signal and the Raleigh backscatter of the West sensing signal. A digital filter can be used to separate these two components. Data detection and DAS can then be performed independently of each other, possibly using the same DSP hardware which will perform the DAS as a low overhead auxiliary function.

We note that there are several parameters that may be advantageously optimized in our inventive architecture according to aspects of the present disclosure.

First—at the transmitter side—in order for the sensing signal to not reduce the effective number of bits (ENOB) available for generating the data signal and degrading back-to-back signal-to-noise ratio (SNR), the sensing signal should not be launched at a higher power than is necessary. However, setting the power of the sensing signal too may degrade the optical SNR of the DAS, thus leading to reduced vibration sensitivity. Fortunately, we have determined that there exists an optimum ratio between the powers of the sensing signal to the data signal.

Figure 4:
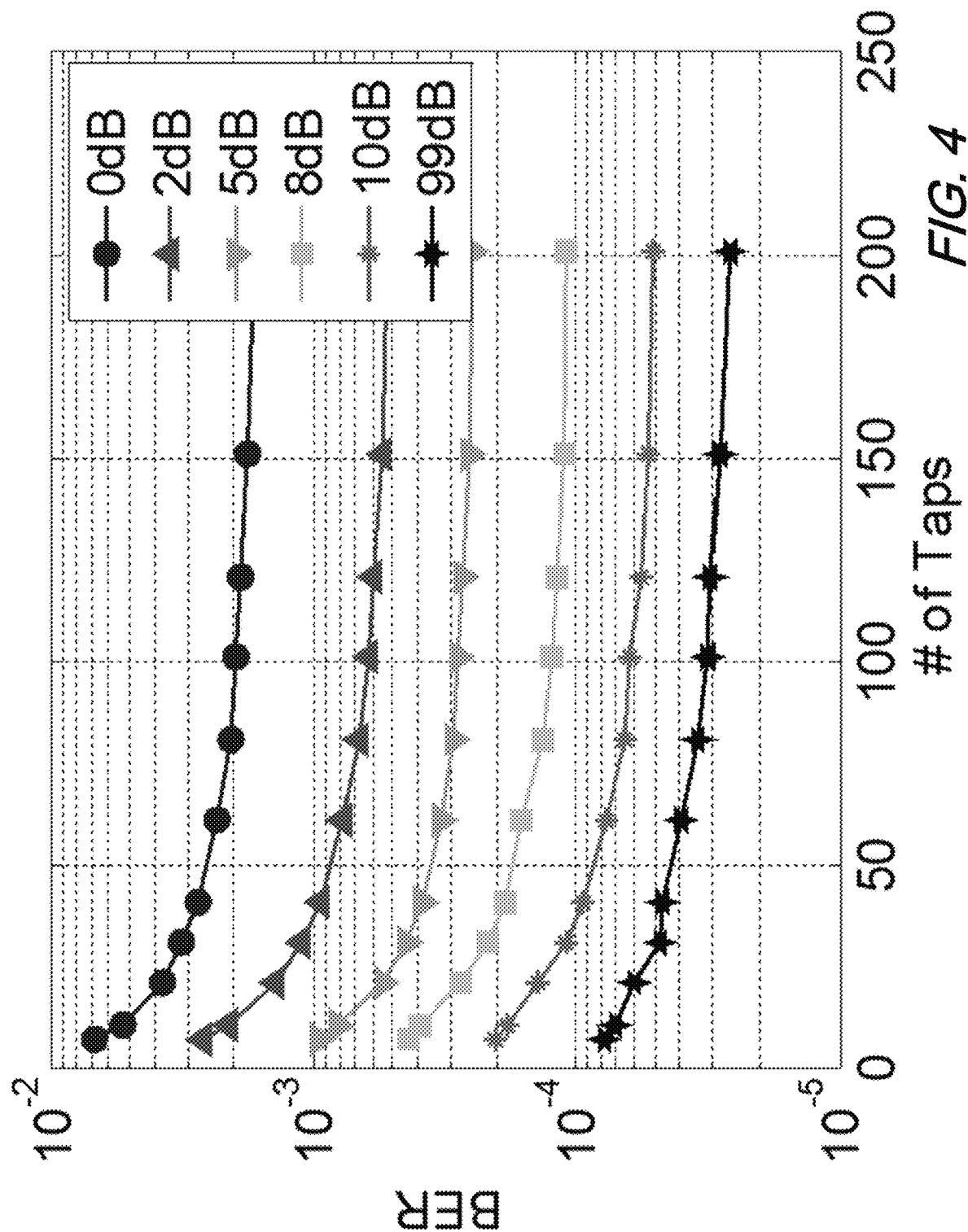
FIG. 4 is a plot showing illustrative impact on performance of self-coherent DP-16QAM over a 5-km link by transmitting a sensing signal along with a data signal wherein the presence of the sensing signal reduces the ENOB at both transmitter DAC and receiver ADC, resulting in an increase in BER according to aspects of the present disclosure.

FIG. 4 is a plot showing illustrative impact on performance of self-coherent DP-16QAM over a 5-km link by transmitting a sensing signal along with a data signal wherein the presence of the sensing signal reduces the ENOB at both transmitter DAC and receiver ADC, resulting in an increase in BER according to aspects of the present disclosure. This figure shows BER versus number of adaptive time-domain equalizer taps used to recover the transmitted symbols, for different power ratios between data signal and sensing signal.

We note that this FIG. 4 shows results of an experiment where the bit-error ratio (BER) of a 32-Gbaud dual-polarization 16QAM (DP-16QAM) signal was measured as a function of number of adaptive time-domain equalizer (TDE) taps for different ratios between the powers of DP-16QAM versus the power of the sensing signal (chirped pulses of 15.625 MHz bandwidth, 2.048 µs duration and 20 kHz repetition rate) that was transmitted alongside. It is observed that at a ratio of 10 dB, a BER below the KP4 threshold of $2.2 \times 10^{-4}$ was achieved using only 7 TDE taps.

Second, at the receiver side, the weak Rayleigh backscatter is optically amplified before combining with the East data signal for joint coherent detection. The noises of the amplified backscatter will add to the noise present in the data signal. This will degrade the BER performance of the data signal. Conversely, noise in the data channel will also reduce the optical SNR of the sensing signal. The power ratio between the amplified backscatter and data signal at the point of combining should be optimized so as not to cause excessive BER penalty on the data signal, while maintaining reasonable sensing performance.

Figure 5A:
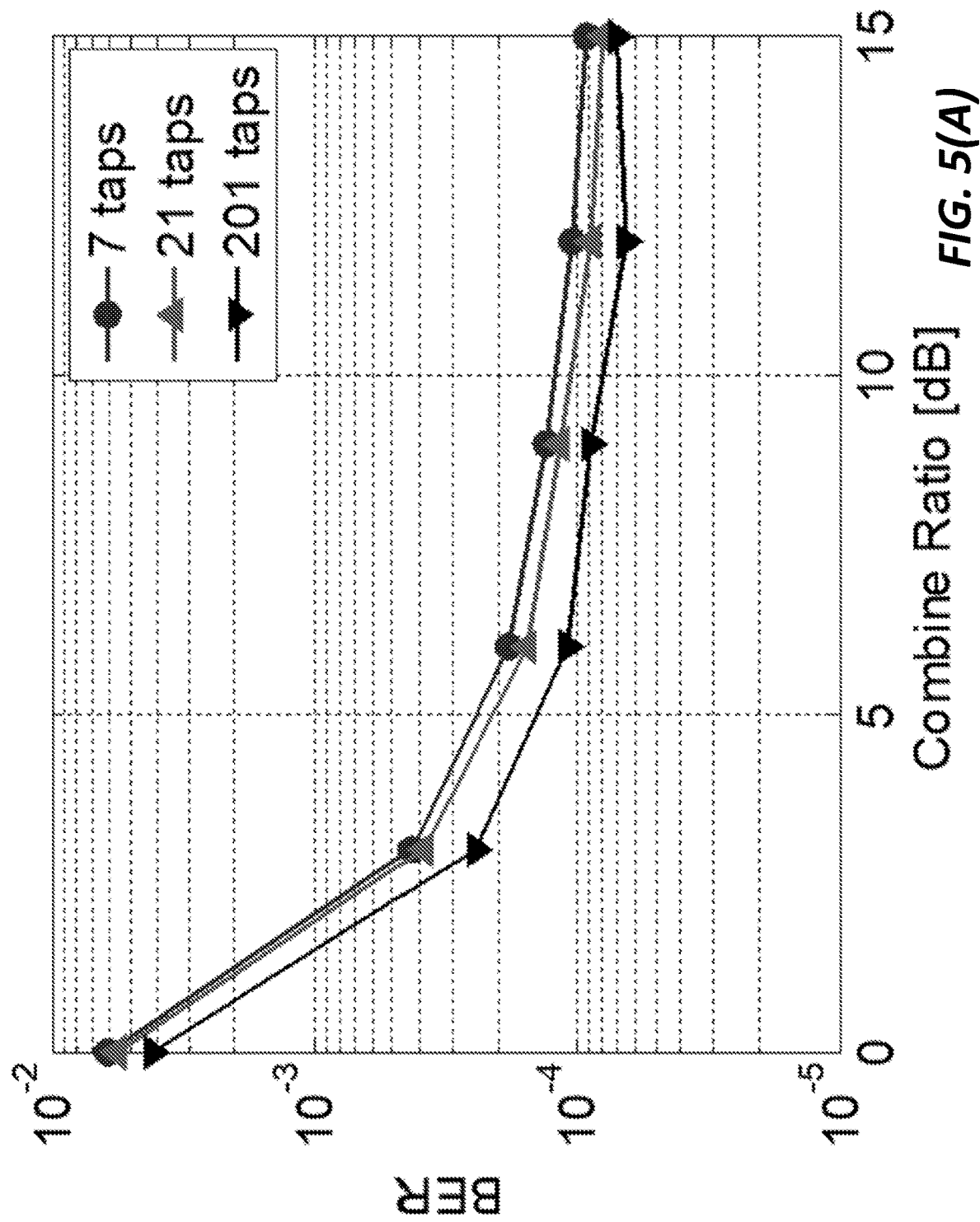
FIG. 5(A) and FIG. 5(B) are a pair of plots showing optimization of the combine ration between East data signal to Rayleigh backscatter of West signal of FIG. 2 according to aspects of the present disclosure.
Figure 5B:
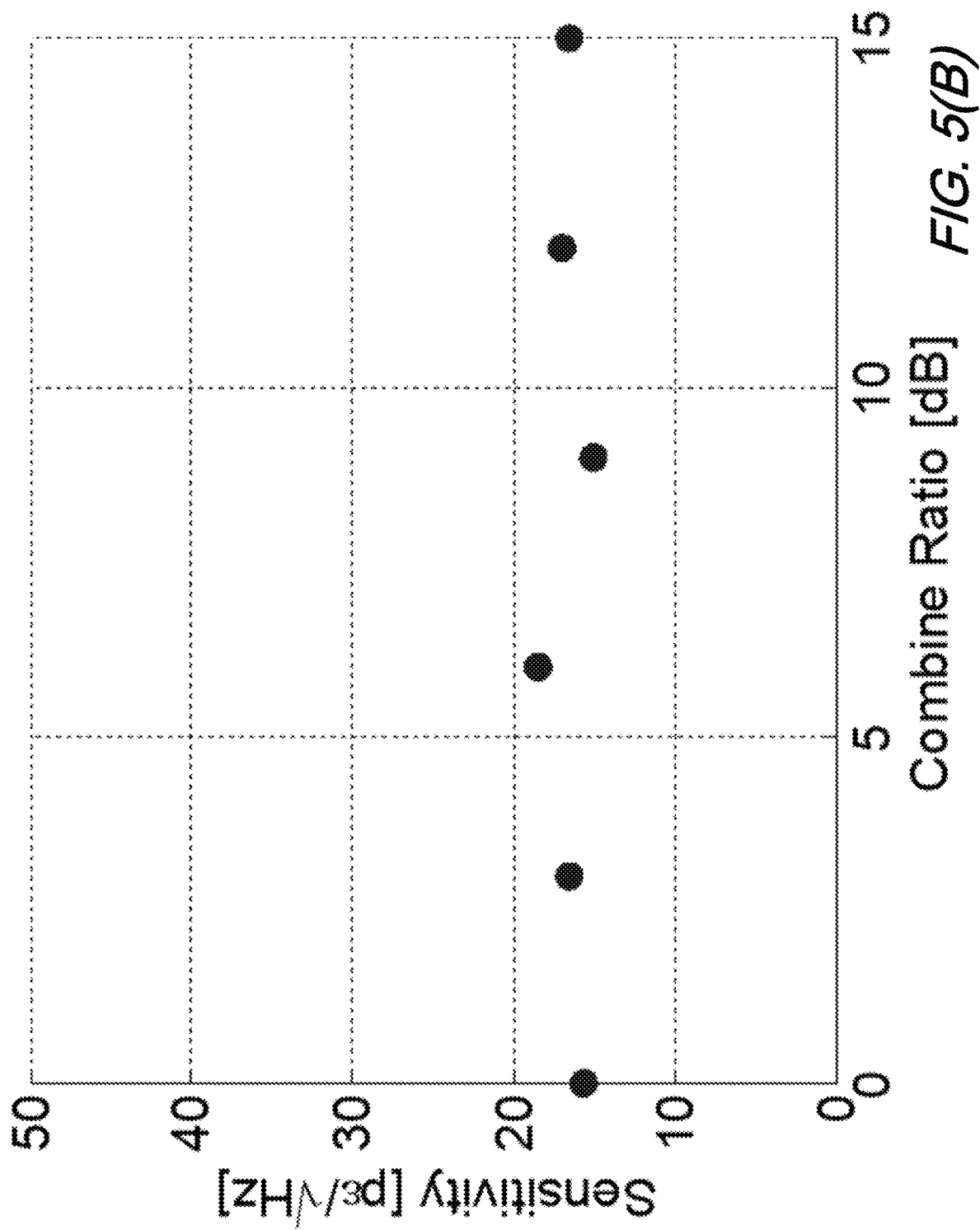

FIG. 5(A) and FIG. 5(B) are a pair of plots showing optimization of the combine ration between East data signal to Rayleigh backscatter of West signal of FIG. 2 according to aspects of the present disclosure. More particularly, FIG. 5(A), and FIG. 5(B) show experimental results where the combine ratio between East data signal and amplified Rayleigh backscatter is varied.

We note that in conventional coherent Distributed Acoustic Sensing (DAS), the laser that is used to generate the sensing signal also serves as the LO for detecting the Rayleigh backscatter (self-coherent detection for sensing). In the architecture according to the present disclosure, the West sensing signal is generated using the West laser, whereas the East laser transmitted over the fiber is used as LO to allow self-coherent detection for the East data signal. The Rayleigh backscatter is thus detected using intradyne coherent detection. Frequency drift of the East and West lasers (i.e., low-frequency laser phase noise) will cause the intermediate frequency (IF) of the sensing channel to be time-varying.

To alleviate this—according to aspects of the present disclosure—we turn off dithering for the lasers at each transponder. Dithering is normally used to reduce the impact of Brillouin scattering when launching an unmodulated laser into fiber. This function is not necessary because data center links are short (only a few km), and any Brillouin backscatter will have little impact on performance other than reducing the available LO power at the receiving transponder.

Additionally—according to aspects of the present disclosure—our arrangement transmits a pilot tone (see FIG. 3) at a pre-determined frequency offset of $\Delta f_2 - \Delta f_1$ from the sensing signal. This allows the receiver's DSP to track frequency drift by tracking the IF of the pilot tone, and thus correctly demodulate the sensing signal.

Finally—according to further aspects of the present disclosure—in the case where chirped pulses are used as the sensing signal, uncertainty in frequency will result in uncertainty in position, so—according to the present disclosure—a correlation method previous proposed is to compensate for positional uncertainty At this point, while we have presented this disclosure using some specific examples, those skilled in the art will recognize that our teachings are not so limited. Accordingly, this disclosure should only be limited by the scope of the claims attached hereto.

The invention claimed is:

1. A dual-fiber, bidirectional, fiber optic communications link supporting distributed fiber optic sensing (DFOS), said communications link comprising:
   a pair of optical fibers optically connecting a pair of transponders, the pair of optical fibers configured such that one of the optical fibers of the pair conveys optical signals in one direction, while the other one of the optical fibers of the pair conveys optical signals in an opposite direction;
   wherein each individual one transponder of the pair of transponders is configured to perform self-coherent detection by using a local oscillator (LO) of the other one of the pair of transponders to perform demodulation; and
   each individual one transponder of the pair of transponders is configured to transmit data signals in a counter-propagating manner with respect to a LO used for demodulation;
   SAID COMMUNICATIONS LINK CHARACTERIZED BY:
   a DFOS interrogator in optical communications with the pair of transponders and optical fibers, said DFOS interrogator configured to generate sensing signals for transmission by one of the transponders, wherein the sensing signals are transmitted along with any transmitted data;
   wherein the sensing signals and the data signals are generated using a same digital-to-analog converter.

2. The communications link of claim 1 FURTHER CHARACTERIZED BY data signals received by a transponder of the pair of transponders is combined with Rayleigh backscatter of transmitted sensing signals prior to coherent detection that includes mixing with a received, counter-propagating LO such that the Rayleigh backscatter is detected using intradyne coherent detection.

3. The communications link of claim 2 FURTHER CHARACTERIZED BY the sensing signals are train of rectangular pulses.

4. The communications link of claim 2 FURTHER CHARACTERIZED BY the sensing signals are a train of chirped pulses.

5. The communications link of claim 2 FURTHER CHARACTERIZED BY the sensing signals are a train of Golay-coded sequences.

6. The communications link of claim 3 wherein a pilot tone is transmitted with the sensing signals to assist frequency demodulation of the sensing signals.

7. The communications link of claim 4 wherein a pilot tone is transmitted with the sensing signals to assist frequency demodulation of the sensing signals.

8. The communications link of claim 5 wherein a pilot tone is transmitted with the sensing signals to assist frequency demodulation of the sensing signals.

9. The communication link of claim 1 wherein a same digital coherent receiver simultaneously recovers both data signals and Rayleigh backscatter.

* * * * *